(12) United States Patent
Sakata et al.

(10) Patent No.: US 6,625,007 B2
(45) Date of Patent: Sep. 23, 2003

(54) ELECTRIC DOUBLE LAYER CAPACITOR OF LOW ESR VALUE AND A METHOD OF FABRICATING SAME WITH LOW PERCENT DEFECTIVE

(75) Inventors: Koji Sakata, Tokyo (JP); Yutaka Nakazawa, Tokyo (JP); Ryuichi Kasahara, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 17 days.

(21) Appl. No.: 10/096,838

(22) Filed: Mar. 14, 2002

(65) Prior Publication Data

US 2002/0131232 A1 Sep. 19, 2002

(30) Foreign Application Priority Data

Mar. 16, 2001 (JP) ........................................ 2001-076591

(51) Int. Cl.[7] ................................................. H01G 9/00
(52) U.S. Cl. ...................... 361/502; 361/503; 361/504; 361/508; 361/510; 361/512; 29/25.03
(58) Field of Search ................................ 361/502, 503, 361/504, 505, 508, 509, 511, 512, 523, 517, 518, 870, 433; 29/25.03

(56) References Cited

U.S. PATENT DOCUMENTS 5,136,473 A * 8/1992 Tsuchiya et al.
5,227,960 A * 7/1993 Kunishi et al.
5,381,303 A * 1/1995 Yoshida et al.
6,324,049 B1 * 11/2001 Inagawa et al.
6,343,003 B1 * 1/2002 Sakata et al.

FOREIGN PATENT DOCUMENTS

JP          61-117238          7/1986

* cited by examiner

Primary Examiner—Dean A. Reichard
Assistant Examiner—Nguyen Ha
(74) Attorney, Agent, or Firm—Young & Thompson

(57) ABSTRACT

A component cell of an electric double layer capacitor is fabricated by forming first and second half portions of the cell. In each of the half portions a polarized electrode impregnated with electrolyte is pasted to a collector electrode so that a stepped portion is formed on the periphery of the collector electrode. A gasket is attached to the stepped portion of each half portion, and a center gasket is attached to the periphery of a separator which is placed between the first and second half portions. Pressure is then applied to the first and second half portions of the cell in directions towards each other at an elevated temperature so that all gaskets are thermally joined together. A plurality of such component cells are stacked in a layered structure and sealed in a package.

20 Claims, 6 Drawing Sheets

FIG. 4
|  | ESR (mΩ) | PERCENT DEFECTIVE (%) | A | B | C | D=B-C | D/A | NO. OF TEST RUNS |
|---|---|---|---|---|---|---|---|---|
| INVENTION | 20 | 2.0 | 25 | 50 | 45 | 5 | 0.2 | 100 |
|  | 22 | 1.2 | 25 | 60 | 45 | 15 | 0.6 | 100 |
|  | 49 | 0.3 | 25 | 70 | 45 | 25 | 1 | 100 |
|  | 120 | 0.0 | 25 | 80 | 45 | 35 | 1.4 | 100 |
| PRIOR ART | 21 | 50.0 | 25 | 50 | 45 | 5 | 0.2 | 100 |
|  | 24 | 20.0 | 25 | 60 | 45 | 15 | 0.6 | 100 |
|  | 60 | 3.0 | 25 | 70 | 45 | 25 | 1 | 100 |
|  | 117 | 0.0 | 25 | 80 | 45 | 35 | 1.4 | 100 |
LEGEND: A = THICKNESS OF SEPARATOR
B = AFTER-SEALING THICKNESS OF GASKETS (=1/2 OF TOTAL)
C = THICKNESS OF POLARIZED ELECTRODE
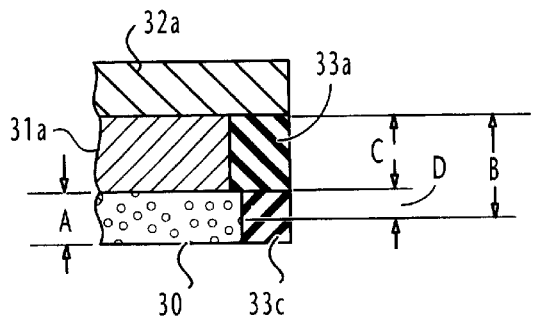
FIG. 5A
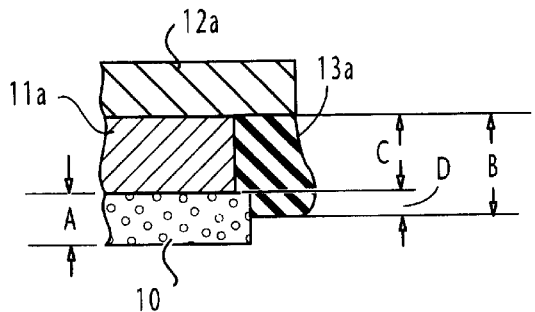
FIG. 5B
PRIOR ART

ELECTRIC DOUBLE LAYER CAPACITOR OF LOW ESR VALUE AND A METHOD OF FABRICATING SAME WITH LOW PERCENT DEFECTIVE

BACKGROUND OF THE INVENTION

1. Field of the Invention

The present invention relates generally to electrolytic capacitors, and more specifically to an electric double layer-capacitor of low ESR (equivalent series resistance) and a method for fabricating the capacitor.

2. Description of the Related Art

Attention has recently been directed to the attractive features of electric double layer capacitors. Effort has been made in developing smaller and yet high capacitance types for combination with lead storage batteries for automobile cell motor applications or combination with solar batteries for backup power applications.

An electric double layer capacitor as disclosed in Japanese Utility Model Publication 61 (1986)-117238 consists of a plurality of capacitor cells stacked in a layered structure. As shown in FIG. 1A, each of the prior art capacitor cells is comprised of a pair of polarized paste electrodes 11a and 11b respectively secured to collector electrodes 12a and 12b, forming upper and lower parts of the capacitor cell with their outer edges. Polarized paste electrodes 11a, 11b have their edges offset from the periphery of the collector electrodes 12a, 12b so that stepped portions are formed at the peripheral edges of the collector electrodes. For separating the polarized electrodes 11a, 11b from each other, a separator 10 of porous material is provided as an ion-permeable member, which is slightly larger than the polarized electrodes 11a, 11b. To provide a sealing contact between the upper and lower parts of the cell in order to prevent the leakage of electrolyte, the prior art method involves attaching gaskets 13a and 13b respectively to the stepped peripheral edges so that the separator 10 is disposed between the inner edges of gaskets 13a, 13b and applying pressure to the cell structure in directions towards each other at an elevated temperature. Under heat and pressure, the gaskets 13a and 13b are softened and thermally joined with each other as illustrated in FIG. 1B. In this process, the gaskets are deformed, bulging outwards as illustrated. In order to achieve the necessary sealing, the gaskets must be sufficiently joined together and cooled into a hardened piece. However, if it is desired to achieve the goal at relatively low pressures, the stepped portions of the cell must be of substantial size to allow the gaskets to sufficiently bulge outwards and each gasket must be sufficiently larger in thickness than the polarized electrode. As a result, the separation between the separator 10 and each polarized electrode tends to increase, with an attendant increase in the equivalent series resistance (ESR) of the cell. This could be avoided by using thick gaskets and applying higher pressure. However, the electrolyte inside the cell tends to leak through the gaskets before they are thermally joined together. This results in an increase in the percent defective. Therefore, the ESR and the percent defective contradict each other. The prior art electric double layer capacitor cannot simultaneously satisfy these important factors.

SUMMARY OF THE INVENTION

It is therefore an object of the present invention to provide a method of fabricating electric double layer capacitors that can simultaneously meet the requirements of low ESR value and low percent defective.

According to a first aspect of the present invention, there is provided a method of fabricating a component cell of an electric double layer capacitor, comprising the steps of forming a first half portion of the cell by pasting a first polarized electrode impregnated with electrolyte to a first collector electrode so that a first stepped portion is formed on the periphery, of the first collector electrode and attaching a first gasket to the first stepped portion, forming a second half portion of the cell by pasting a second polarized electrode impregnated with electrolyte to a second collector electrode so that a second stepped portion is formed on the periphery of the second collector electrode and attaching a second gasket to the second stepped portion, attaching a third gasket to the periphery of a separator and placing the separator between the first and second half portions of the cell, and applying pressure to the first and second half portions of the cell in directions towards each other at an elevated temperature so that the first and second gaskets are thermally joined with the third gasket.

According to a second aspect, the present invention provides a capacitor cell comprising first and second collector electrode, first and second polarized electrodes impregnated with electrolyte and pasted to the first and second collector electrodes, respectively, so that first and second stepped portions are respectively formed on the periphery of the first and second collector electrodes, a separator disposed between the first and second polarized electrodes, and first and second gaskets attached to the first and second stepped portions, respectively, and a third gasket attached to the periphery of the separator, the first and second gaskets being thermally joined with the third gasket.

According to a third aspect, the present invention provides an electric double layer capacitor comprising a plurality of capacitor component cells stacked in a layered structure. Each of the capacitor component cells comprises first and second collector electrodes, first and second polarized electrodes impregnated with electrolyte and pasted to the first and second collector electrodes, respectively, so that first and second stepped portions are respectively formed on the periphery of the first and second collector electrodes; a separator disposed between the first and second polarized electrodes; and first and second gaskets attached to the first and second stepped portions, respectively, and a third gasket attached to the periphery of said separator, the first and second gaskets being thermally joined with the third gasket.

BRIEF DESCRIPTION OF THE DRAWINGS

The present invention will be described in detail further with reference to the following drawings, in which:

FIG. 4 is a tabulation of the operating characteristics of the present invention in comparison with the prior art;

FIGS. 5A and 5B are cross-sectional views in part of the present invention and the prior art, respectively, for illustrating the conventions used in the tabulation of FIG. 4;

DETAILED DESCRIPTION

Figure 1A:
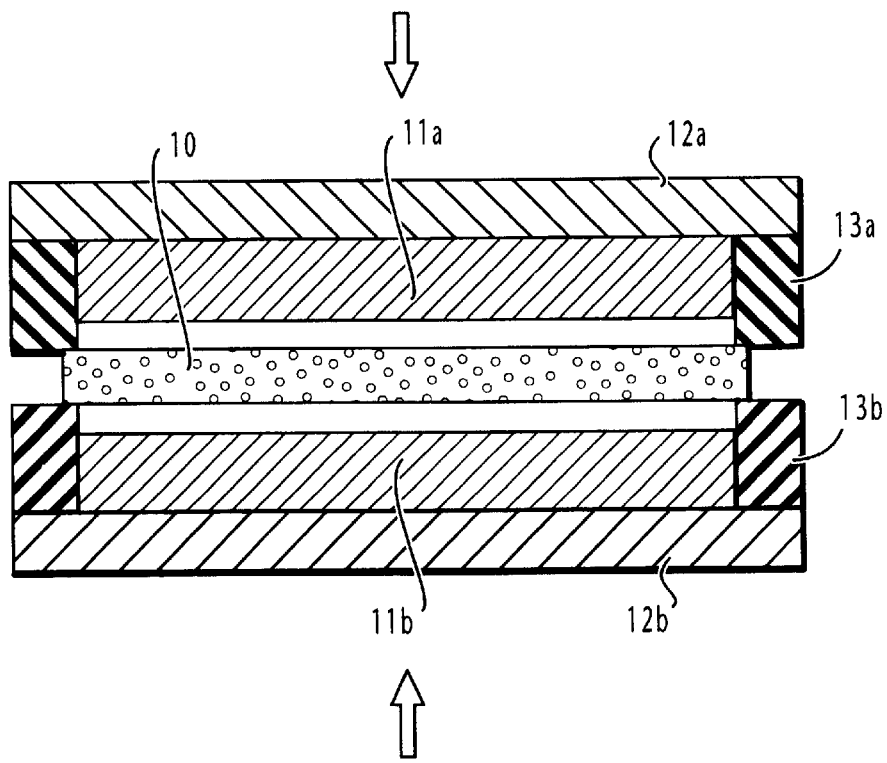
FIGS. 1A and 1B are cross-sectional views of a prior art capacitor component cell when two gaskets are thermally joined together for sealing the cell.
Figure 1B:
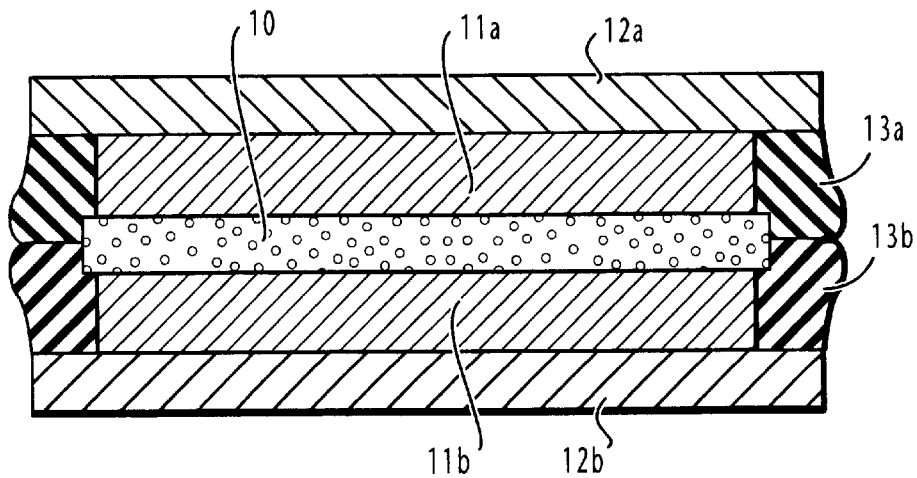
Figure 2:
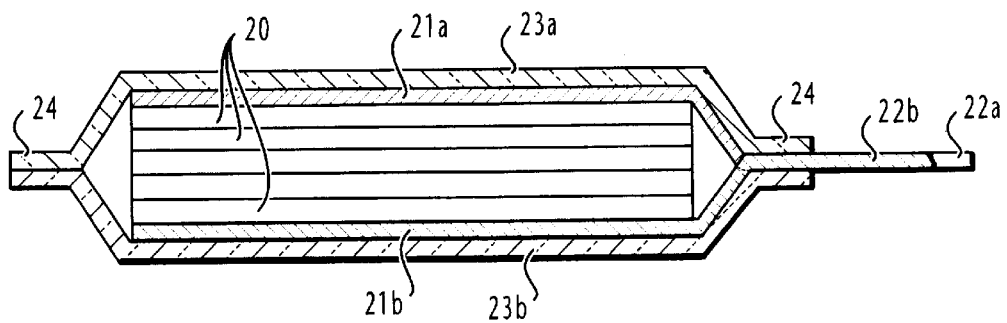
FIG. 2 is a cross-sectional view of an electric double layer capacitor of the present invention.

In FIG. 2, the electric double layer capacitor according to a first embodiment of the present invention comprises a plurality of capacitor component cells 20 stacked one upon another to form a multi-layered structure. Each component cell has upper and lower collector electrodes respectively contacting with the lower and upper collector electrodes of adjacent component cells. To the top and bottom collector electrodes of the layered structure upper and lower conducting members 21a and 21b with lead lines 22a and 22b are respectively provided. The whole structure is then heated at a temperature of 85° C. for a period of two hours so that it is rigidly integrated. The integrated structure is encased in an air-tightly sealing package 23. This is done by covering the structure with upper and lower half-vessels 23a, 23b of deformable material, each of which is a laminate of an inner aluminum film and an outer insulating film such as olefin-group resin in an environment lower than atmospheric pressure. Heat is applied to the outer edges 24 of the packages 23 so that they are thermally joined together and the inner stacked component cells are sealed under negative pressure relative to the outer atmospheric environment, so that the package 23 will be subjected to a constant external pressure during use.

Figure 3A:
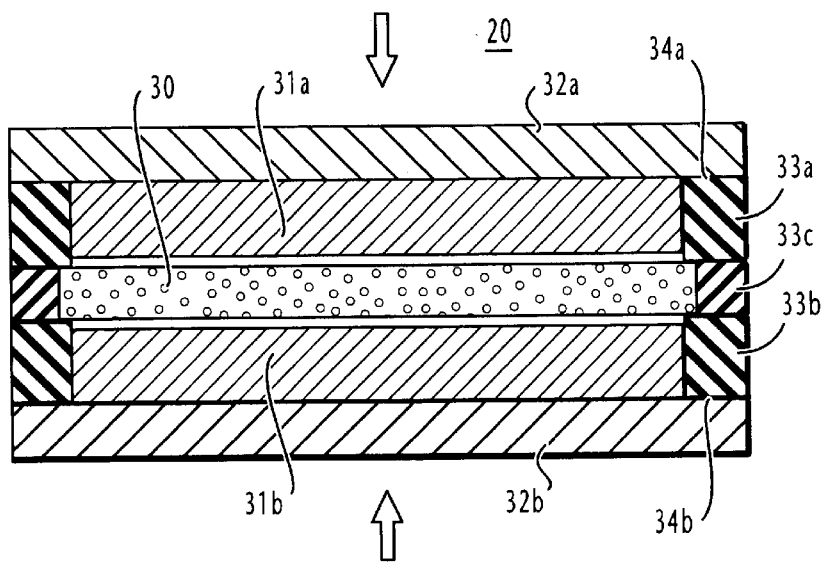
FIGS. 3A and 3B are cross-sectional views of the capacitor component cell of the present invention during successive stages of fabrication.
Figure 3B:
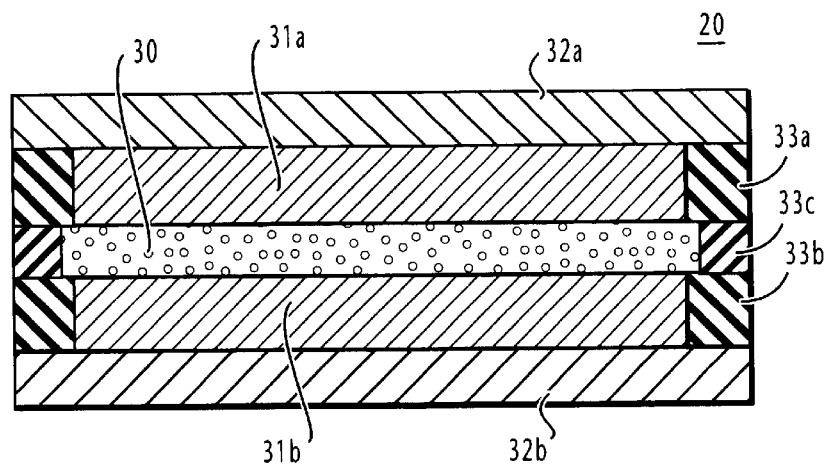

The following is a description of a fabrication process of each of the capacitor component cells 20 according to the present invention with reference to FIGS. 3A and 3B.

As shown in FIG. 3A, the capacitor component cell 20 is divided into upper and lower halves of identical structure. The upper half of the cell consists of a polarized (paste) electrode 31a and a collector electrode 32a to which the polarized electrode 31a is secured. The periphery of the polarized electrode 31a is offset from the periphery of the collector electrode 32a so that stepped peripheral portions 34a and 34b are formed. A gasket 33a is attached to the stepped peripheral portions. In order to tightly seal the interior of the cell, the gasket 33a has a thickness somewhat larger than the thickness of the polarized paste electrode 31a as shown in FIG. 3A. Likewise, the lower half of the cell consists of a polarized paste electrode 31b and a collector electrode 32b to which the polarized electrode 31b is secured. The periphery of the polarized electrode 31b is offset from the periphery of the collector electrode 32b to form stepped peripheral portions to which is attached a gasket 33b having a thickness larger than the thickness of the polarized paste electrode 31b.

Therefore, the gasket 33a has a portion that extends inwardly from the peripheral side walls of the separator 30 and surrounds the peripheral side walls of the polarized electrode 31a, and the gasket 33b has a portion that extends inwardly from the peripheral side walls of the separator and surrounds the peripheral side walls of the polarized electrode 31b.

Collector electrodes 32a, 32b are conducting films formed of olefin-group resin such as crosslinked polymer of ethylene-styrene-butylene in which powdered carbon is dispersed.

Polarized electrodes 31a, 31b are formed of activated carbon powder and a binder mixed in a solvent, for example. The mixture is pasted to each of the collector electrodes 32a, 32b by using a printing process so that it is formed into the shape of a square of 3 cm×3 cm with a thickness of 50 $\mu$m. In a subsequent drying process, the solvent is removed from the mixture. Electrolyte (sulfuric acid solution) is then injected into the polarized electrodes 31a, 31b.

The upper and lower halves of the cell are separated from each other by a separator 30, which is a 25-$\mu$m thick, porous film of non-conducting ion-penetrable material, such as polypropylene resin. Separator 30 is slightly oversized with respect to the polarized electrodes 31a and 31b. Thus, the inner edge portions of gaskets 33a and 33b are in contact with the periphery of separator 30. To the periphery of the separator 30 is attached a third gasket 33c having the same thickness as that of the separator 30. Gaskets 33a, 33b and 33c are formed of the same thermoplastic resin as the base material of the collector electrodes 32a, 32b. The use of polyolefin-group resin (which is transparent to visible light) is preferred since it allows detection of leakage of electrolyte during manufacture. The outer edges of the gaskets 33a, 33b, 33c are vertically aligned with each other.

With the separator and all gaskets being placed in position as illustrated in FIG. 3A, the capacitor component cell 20 is placed in a low-pressure chamber so that the collector electrodes 32a and 32b are pressed towards each other at a pressure of 0.003 Pa, while the cell is heated at 120° C. for 10 seconds. As a result, the gaskets 33a and 33b are pressed towards each other and fused with the center gasket 33c. As a result, the gaskets 33a, 33b and 33c are thermally jointed together. Being of the same thermoplastic material, they are hardened into an integrated piece when the cell is cooled down.

Since it is not necessary to allow gaskets to bulge outwards considerably when pressure is applied, the polarized electrodes 31a and 31b can be brought to a close distance to the separator 30 as shown in FIG. 3B. The three-layered gasket sealing arrangement results in a consistently low ESR value, while preventing the injected electrolyte from leaking outside.

FIG. 4 shows the results of experiments in which the present invention is compared with the prior art to demonstrate the beneficial effects of the present invention and to determine the range of preferred after-sealing values of gasket thickness, using A-$\mu$m thick separators and C-$\mu$m thick polarized electrodes for a plurality of gaskets with a different after-sealing thickness value B as illustrated in FIGS. 5A and 5B for the present invention and the prior art, respectively. Note that the thickness value B is equal to ½ of the total thickness of the thermally joined gaskets 33a, 33b and 33c as clearly shown in FIG. 5A. FIG. 4 also shows the difference D=B−C and the ratio D/A. Each row represents results experiment data gained from the testing of 100 component cells.

Figure 6:
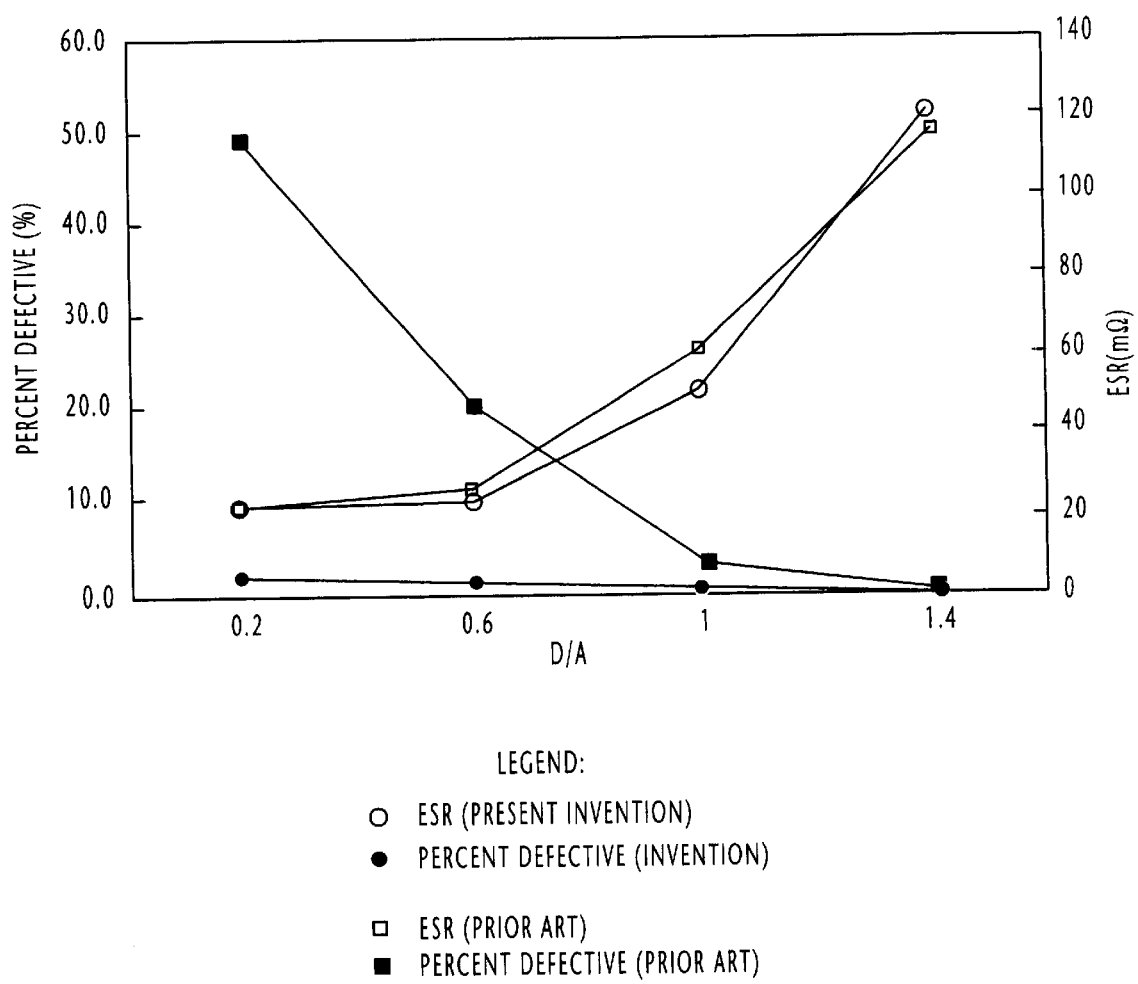
FIG. 6 is a graphic representation of the comparison between the present invention and the prior art.

As graphically represented in FIG. 6, the percent defective of the present invention substantially remains constantly low regardless of the ratio D/A. It is seen that, in terms of the ESR value e D/A value is preferably in the range between 0.2 and 0.6. Further, it is found that for D/A values lower than 0.2 the sealing contact between gaskets as well as between the gaskets and the collector electrodes falls below the acceptable level, and that for D/A values higher than 0.6 the ESR values are not suitable for use. On the other hand, the percent defective of the prior art is considerably high in the range of low D/A values although the ESR values in this range are low and satisfactory.

Figure 7:
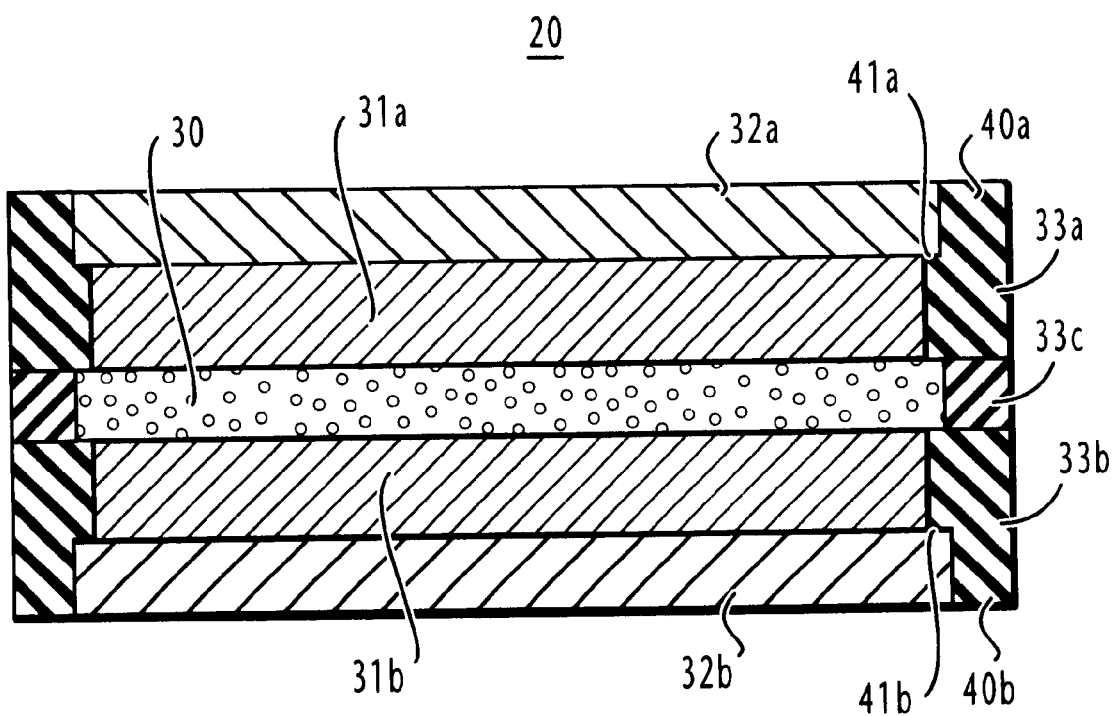
FIG. 7 is a cross-sectional view of a modified electric double layer capacitor of the present invention.

In a further preferred embodiment shown in FIG. 7, possible short-circuit which may occur between collector electrodes 32a and 32b is avoided by extending the gaskets 33a and 33b in vertical directions by an amount corresponding to the thickness of each collector electrode as shown at 40a and 40b. Extending portions 40a and 40b are respectively formed with stepped portions 41a and 41b on their inner periphery so that the collector electrodes 32a, 32b are snugly fitted in the stepped portions of the corresponding gaskets. In this way, the peripheral side walls of each of collector electrodes 32a, 32b are completely surrounded with the corresponding insulating gasket 33. This arrangement reduces the possibility that the edge portions of collector electrodes 32a, 32b are brought into contact with each other under pressure when component cells are air-tightly sealed in the package.

Figure 8:
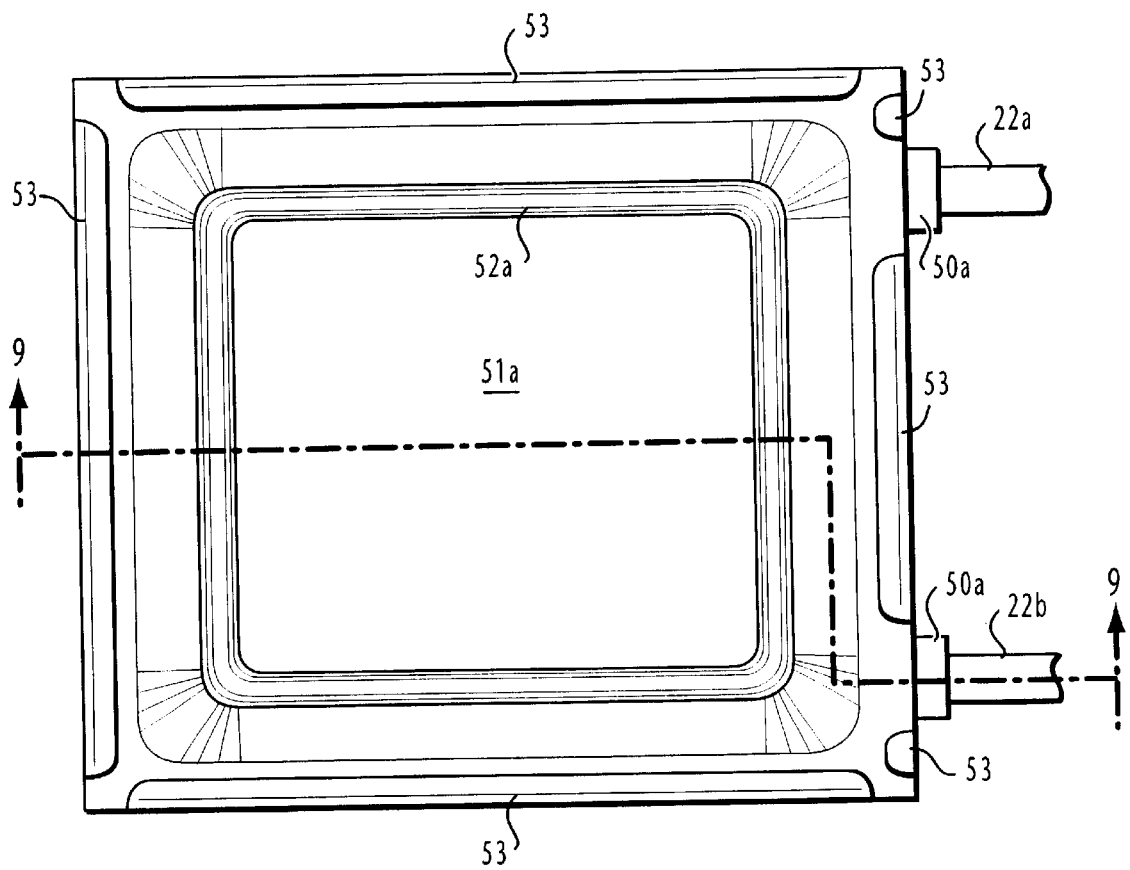
FIG. 8 is a plan view of a further modification of the electric double layer capacitor of the present invention.
Figure 9:
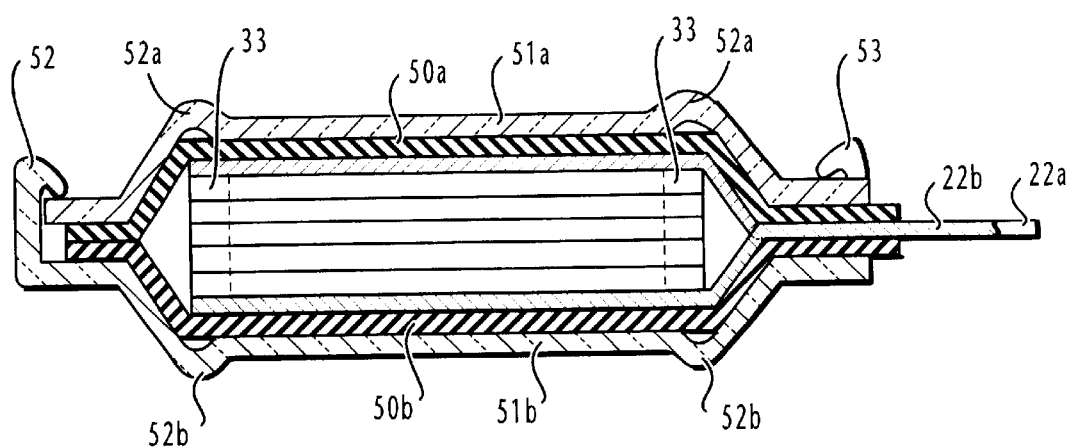
FIG. 9 is a cross-sectional view taken along the lines 9—9 of FIG. 8.

Since the package 23 is formed of deformable laminate as described above, it is preferable to strengthen it with an armored outer package. As shown in FIGS. 8 and 9, the outer package 51 comprises upper and lower vessels 51a and 51b, both of which are formed with ribs 52a and 52b, respectively, to strengthen the portions of the capacitor that correspond to the gaskets 33 of the sealed component cells. This rib structure prevents the gaskets of the inner structure from being fractured upon external impact, which would cause short circuits between collector electrodes.

The provision of the outer package 51 allows vessels 50a, 50b of the inner package to be formed of more flexible thermoplastic material than is used in the previous embodiment. The required negative inside pressure can be satisfied with less difficulty to obtain low ESR values.

Additionally, the ESR value of an electric double layer capacitor can be further reduced by compressing the vessels 51a and 51b of the outer package. This is accomplished by means of a plurality of claws 53 that firmly grip the vessels together so that the component cells inside are held under constant pressure in the direction of thickness.

Suitable material for the outer package 51 is a composite laminate of a metal film such as SUS 304 stainless steel and a film of insulating fez such as polyethylene terephthalate or nylon. Such a laminate is formed into the required shape using a bending press so that the insulating film faces outside.

What is claimed is:

1. A method of fabricating a component cell of an electric double layer capacitor, comprising the steps of:
    a) forming a first half portion of the cell by pasting a first polarized electrode impregnated with electrolyte to a first collector electrode so that a first stepped portion is formed on the periphery of the first collector electrode and attaching a first gasket to the first stepped portion;
    b) forming a second half portion of the cell by pasting a second polarized electrode impregnated with electrolyte to a second collector electrode so that a second stepped portion is formed on the periphery of the second collector electrode and attaching a second gasket to the second stepped portion;
    c) attaching a third gasket to the periphery of a separator and placing the separator between said first and second half portions of the cell; and
    d) applying pressure to said first and second half portions of the cell in directions towards each other at an elevated temperature so that said first and second gaskets are thermally joined with said third gasket.

2. A capacitor cell comprising:
    first and second collector electrodes;
    first and second polarized electrodes impregnated with electrolyte and pasted to said first and second collector electrodes, respectively, so that first and second stepped portions are respectively formed on the periphery of the first and second collector electrodes;
    separator disposed between said first and second polarized electrodes; and
    first and second gaskets attached to said first and second stepped portions, respectively, and a third gasket attached to the periphery of said separator, said first and second gaskets being thermally joined with said third gasket.

3. The capacitor cell of claim 2, wherein said first gasket has a portion which extends inwardly from peripheral side walls of the separator and surrounds peripheral side walls of the first polarized electrode and said second gasket has a portion which extends inwardly from the peripheral side walls of the separator and surrounds peripheral side walls of the second polarized electrode.

4. The capacitor cell of claim 2, wherein a portion of said first gasket surrounds peripheral side walls of said first collector electrode and a portion of said second gasket surrounds peripheral side walls of said second collector electrode.

5. The capacitor cell of claim 2, wherein a ratio of a difference between ½ of a total thickness value of the thermally joined first, second and third gaskets and a thickness value of one of said polarized electrodes to a thickness value of said separator is in the range between 0.2 and 0.6.

6. An electric double layer capacitor comprising:
    a plurality of capacitor component cells stacked in a layered structure;
    each of the capacitor component cells comprising:
        first and second collector electrodes;
        first and second polarized electrodes impregnated with electrolyte and pasted to said first and second collector electrodes, respectively, so that first and second stepped portions are respectively formed on the periphery of the first and second collector electrodes;
        a separator disposed between said first and second polarized electrodes; and
        first and second gaskets attached to said first and second stepped portions, respectively, and a third gasket attached to the periphery of said separator, said first and second gaskets being thermally joined with said third gasket.

7. The electric double layer capacitor of claim 6, wherein said first gasket has a portion which extends inwardly from peripheral side walls of the separator and surrounds peripheral side walls of the first polarized electrode and said second gasket has a portion which extends inwardly from the peripheral side walls of the separator and surrounds peripheral side walls of the second polarized electrode.

8. The electric double layer capacitor of claim 6, wherein a portion of said first gasket surrounds peripheral side walls of said first collector electrode and a portion of said second gasket surrounds peripheral side walls of said second collector electrode.

9. The electric double layer capacitor of claim 6, wherein a ratio of a difference between ½ of a total thickness value of the thermally joined first, second and third gaskets and a thickness value of one of said polarized electrodes to a thickness value of said separator is in the range between 0.2 and 0.6.

10. The electric double layer capacitor of claim 6, further comprising:
    a first conducting member secured to one of the collector electrodes of an uppermost component cell of said layered structure and a second conducting member attached to one of the collector electrodes of a lowermost component cell of said layered structure;

first and second lead lines extending from said first find second conducting members; and a package for sealing said layered structure with said first and second conducting members secured thereto so that said first and second lead lines extend outwards of said package.

11. The electric double layer capacitor of claim 10, wherein said package is formed of a laminate of a metal film and an insulating film, the metal film facing inside of the package and the insulating film facing outside of the package.

12. The electric double layer capacitor of claim 10, wherein said package comprises:

an inner housing formed of a thermoplastic material; and an outer housing formed of a metal film.

13. The electric double layer capacitor of claim 12, wherein at least one of said inner and outer housings is formed with a rib portion in a position corresponding to a position of the layer structure where the gaskets of said plurality of component cells are located.

14. The electric double layer capacitor of claim 12, wherein said outer housing comprises first and second vessels one of which is formed with a plurality of claws for providing a gripping contact with the other vessel.

15. The method according to claim 1, further comprising the step of vertically aligning an outer edge of each of said first, second and third gaskets with each other.

16. The method as claimed in claim 15, wherein the first, second and third gaskets are formed from a same material.

17. The method as claimed in claim 1, further comprising the step of cooling the cell so that the first, second and third gaskets are hardened into an integrated piece.

18. The capacitor cell according to claim 2, wherein an outer edge of each of said first, second and third gaskets are vertically aligned with each other.

19. The capacitor cell according to claim 18, wherein the first, second and third gaskets are formed from a same material.

20. The capacitor cell according to claim 2, wherein the first, second and third gaskets are hardened into an integrated piece.

* * * * *